Patented Mar. 5, 1946

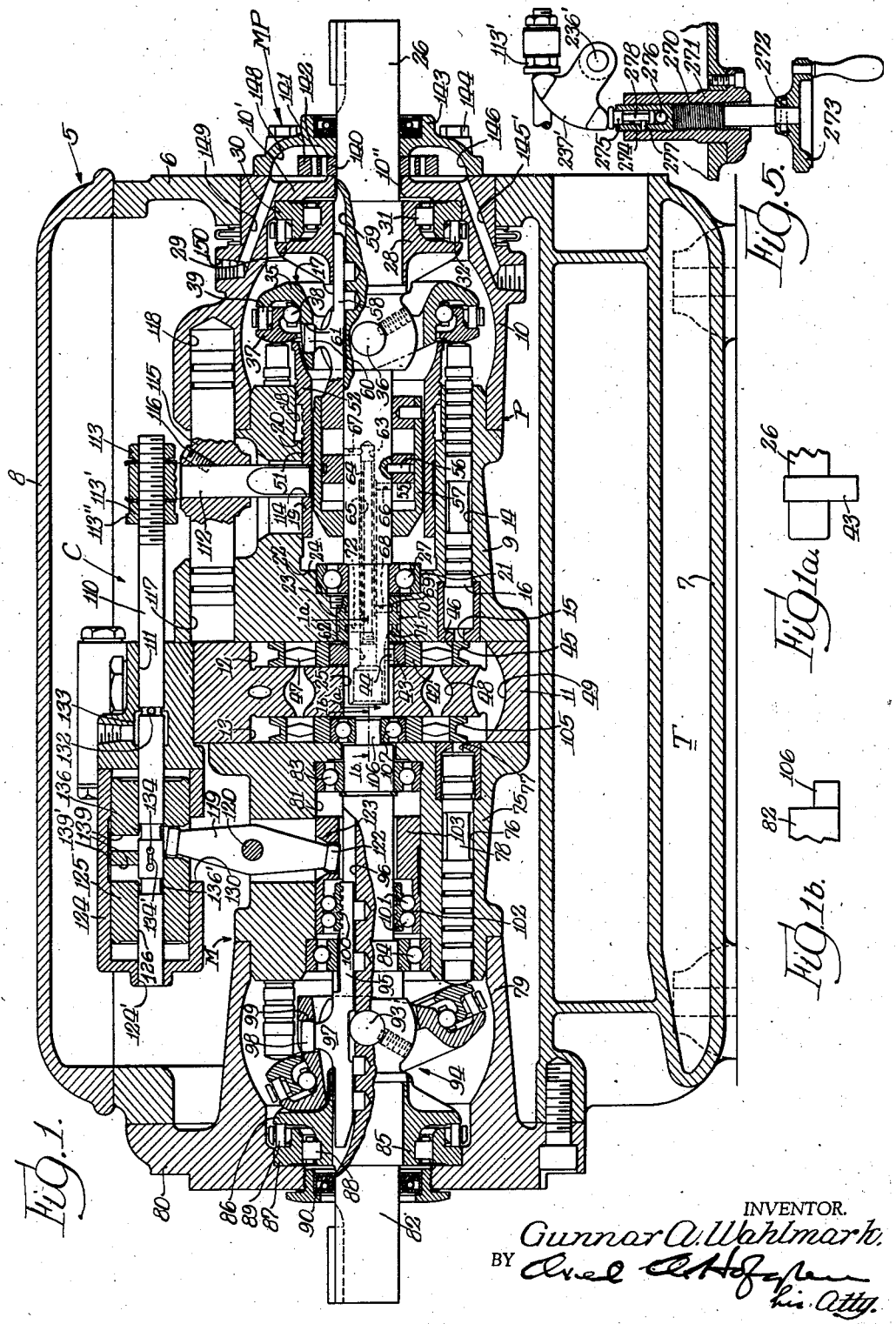

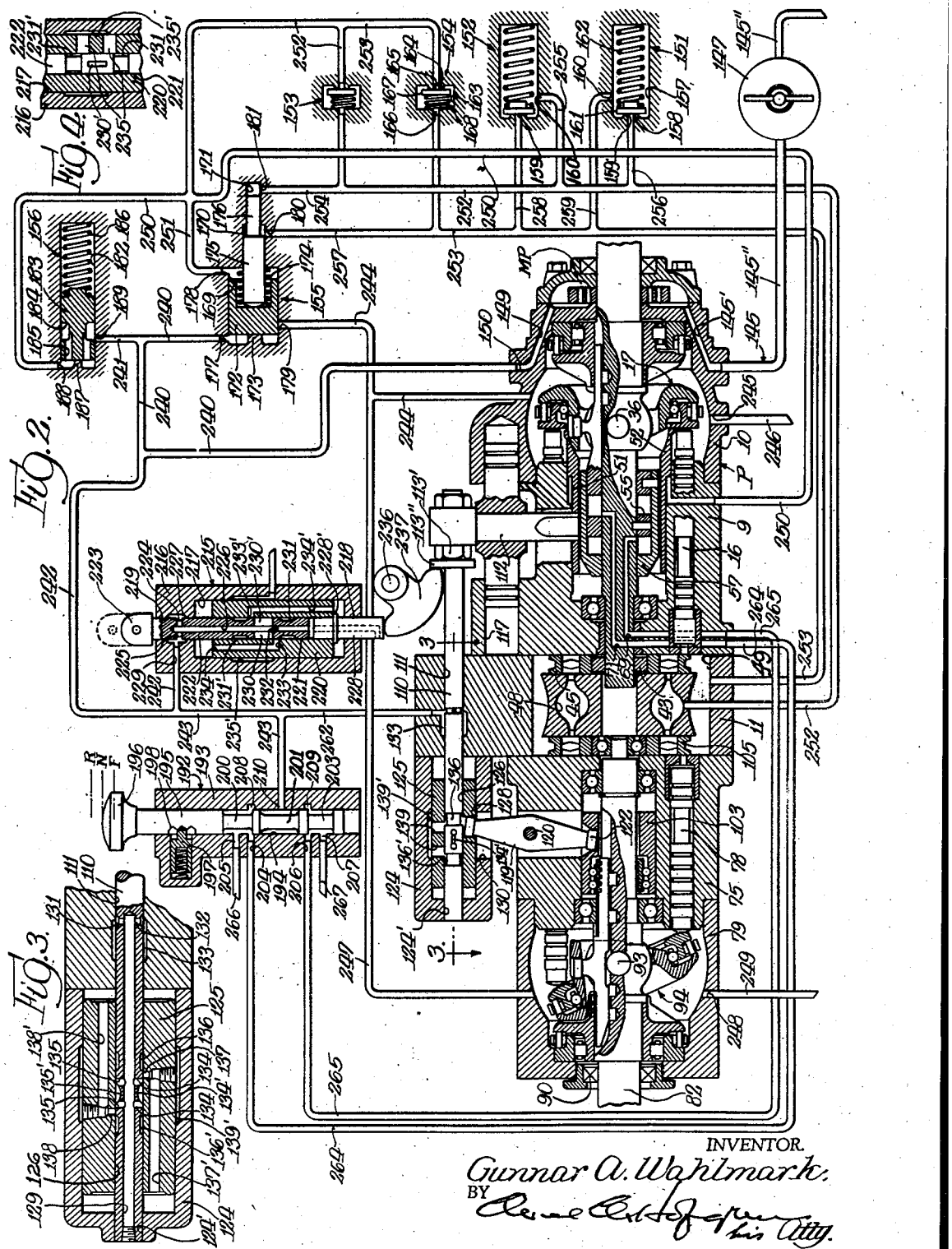

2,395,980

UNITED STATES PATENT OFFICE 2,395,980

HYDRAULIC TRANSMISSION

Gunnar A. Wahlmark, Rockford, Ill., assignor to Sunstrand Machine Tool Co., Rockford, Ill., a corporation of Illinois Application October 11, 1941, Serial No. 414,587

25 Claims. (Cl. 60—53)

The invention relates generally to a hydraulic transmission and more particularly to control means for the transmission.

One object of the invention is to provide, in a hydraulic transmission having a pump and a motor, new and improved control means for governing the displacement of both the pump and the motor.

Another object is to provide in a hydraulic transmission having a pump and a motor, new and improved control means for simultaneously governing the displacement of both the pump and the motor, and means physically separate and independent of the first mentioned means to govern the direction of operation of the motor.

Another object is to provide in a hydraulic transmission having a pump and a motor, each variable as to displacement, a common, positively interconnected control means for simultaneously varying the displacement of both the pump and the motor.

A further object is to provide a hydraulic transmission having a pump adjustable to vary displacement as well as direction of discharge, a motor adjustable to vary displacement, control means governing the direction of fluid discharge by the pump, control means for governing the displacement of the pump operable wholly independently of the first mentioned means and for either direction of fluid discharge by the pump, and control means for governing the displacement of the motor having a part mechanically connected to said displacement control means for said pump.

Other objects and advantages will become apparent from the following detailed description taken in connection with the accompanying drawings, in which:

Fig. 1 is a longitudinal vertical sectional view of a transmission embodying the features of the invention.

Fig. 1a is a fragmentary view taken approximately along the line 1a—1a of Fig. 1.

Fig. 1b is a fragmentary view taken approximately along the line 1b—1b of Fig. 1.

Fig. 2 is a diagrammatic view showing the transmission of Fig. 1 connected in a hydraulic circuit.

Fig. 3 is an enlarged sectional view taken along the line 3—3 of Fig. 2.

Fig. 4 is a fragmentary diametrical sectional view of the servo valve means taken in a plane at right angles to Fig. 2.

Fig. 5 is a fragmentary view partially in elevation and partially in section of a modified form of stroke adjuster.

While the invention is susceptible of various modifications and alternative constructions, it is here shown in the drawings and will hereinafter be described in a preferred form and one modification. However, it is not intended that the invention is to be limted thereby to the specific forms disclosed. On the contrary it is intended to cover all modifications and alternative constructions falling within the spirit and scope of the invention as defined in the appended claims.

The transmission comprises generally a hydraulic motor, generally designated M, a pump P for supplying operating fluid to the motor, and control means, generally designated C, for determining the displacement of the pump and the motor. The pump and motor are arranged in an end to end relationship and, together with the control means C, are encased in an elongated housing, generally designated 5. This comprises an open ended main portion 6 providing a supporting base 7 with a reservoir or tank T for the fluid employed in the transmission, and a top closure 8 removably secured by suitable means, such as bolts (not shown).

The pump P is of the wobbler type and save for a minor change in the casing is identical in construction with the pump disclosed in my copending application Serial No. 410,860, filed September 15, 1941, since issued as Letters Patent No. 2,383,092, dated August 21, 1945. The pump P comprises a cylinder block 9 having one end, herein its outer or right hand end, partially and non-rotatably received within a casing member 10, which in turn projects into the opening in the right hand end of the main housing portion 6. At the end of the cylinder block opposite the casing member 10, in fact interposed between the pump and the motor, is a common valve block 11. The faces of the valve block 11 are formed with circular reecsses 12 and 13. The recess 12 with the end of the cylinder block 9 forms a valve chamber housing valve means, more particularly described hereinafter.

The cylinder block 9 is formed with a plurality of parallel, longitudinally extending and annularly arranged cylinders 14 opening at their left ends, as viewed in Fig. 1, to the valve chamber 12 through an annular series of ports 15, and at the other ends opening without restriction to the interior of the casing member 10. Reciprocable in each cylinder 14 is a piston 16 adapted in all positions to extend partially from the cylinder block for engagement by an actuating means, generally designated 17. Extending axially of the cylinder block is a stepped bore having a first portion 18 opening through the right hand end of the cylinder block, as viewed in Fig. 1, a second portion 19 of slightly smaller diameter so as to form an annular shoulder 20, a third portion 21 of still smaller diameter so as to form an annular shoulder 22, and a fourth and final portion 23 of still smaller diameter to form a shoulder 24. Extending longitudinally of the pump with its inner end projecting through the valve chamber 12 and into a recess 25 in the block 11, and with its outer end projecting outwardly of the housing for connection with a motor, is a shaft 26. Near its inner end the shaft is journaled in a ball bearing 27 seated in the portion 21 of the stepped bore, while near its outer end the shaft is surrounded by a sleeve 28 formed with a radially projecting flange 29. The casing member 10 is provided with an inwardly extending annular flange 10' providing a circular opening 10" through which the shaft 26 projects. Mounted in the casing member 10 adjacent the flange 10' is an annular ring 30, generally L-shaped in cross section, and between the ring and the sleeve 28 there is interposed a roller bearing 31, while between the ring and the flange 29 there is interposed a roller bearing 32, respectively supporting the shaft radially and against end thrust.

The actuating means 17 here takes the form of a wobbler composed of an inner annular member 35, pivotally mounted on the shaft 26 by means of a pin 36, and an outer annular ring member 37. This ring member 37 is rotatable relative to the inner member 35, and to that end is generally T-shaped in cross section, and interposed between the members 35 and 37 is a ball bearing 38, to take the radial thrust, and a roller bearing 39, to take the end thrust. The member 37 is, of course, disposed to engage the projecting ends of the pistons 16, and to that end the ends of the pistons, as well as the surface of the members 37 contacted thereby, are rounded. Herein the curvature given to the ends of the pistons and to the surface of the member 37 is such that the moment arms of the inner or forward half of the wobbler relative to the pin 36 when the wobbler is tilted from its right angular position relative to the shaft 26 will have such proportion with respect to the moment arms of the outer or rearward half of the wobbler as to tend to cause the reaction of the pistons on the wobbler to restore the same to neutral or no-stroke position.

In order to control the flow of fluid into or out of the cylinders 14, there is interposed in the chamber 12 a wheel-like or spoked valve 42, such as more particularly disclosed and claimed in my Patent No. 2,190,812, dated February 20, 1940. This valve is mounted eccentrically with respect to the shaft 26 and to that end such eccentric mounting is here obtained by the employment of an eccentric cam 43 non-rotatably secured on the end of the shaft 26 by means such as a pin 44. The outer rim or periphery 45 of the valve 42 serves, due to the eccentric movement of the valve, to connect the ports 15 alternately to the outer circumferential portion of the chamber 12, or to an annular passage 46 formed by the spokes 47 of the valve. This annular passage in the valve is always in communication with an annular passage 48 formed in the block 11 which opens to the chamber 13 in a manner similar to its opening in the chamber 12. The outer portions of the chambers 12 and 13 are interconnected by a passage 49 to complete a hydraulic circuit between the pump and the motor.

Unique governing means of a character more particularly disclosed and claimed in my above-mentioned Patent No. 2,383,092, are herein provided for determining the position of the wobbler. This control means permits of a pre-loading of the wobbler and enables slight increase in pump displacement to take place automatically to compensate for increased working pressures. Moreover, this control means, in conjunction with certain valve means briefly disclosed herein, but more particularly disclosed and claimed in my said Patent No. 2,383,092, permits of adjustment of the wobbler by a force of constant value regardless of the pressure at which the pump may be working at any particular time. Comprising this governing means is a cylindrical control member or cam 51 slidable longitudinally in the portion 19 of the stepped bore in the cylinder block 9, so as to be concentric of the shaft 26 and also concentric of the wobbler 17. At its right hand end, as viewed in Fig. 1, the control cam 51 is enlarged to form a piston 52 slidable in the portion 18 of the stepped bore. At its extreme right hand end the control cam 51 is provided with an end edge disposed in a plane at right angles to the shaft 26 and adapted to bear against the outer member 37 of the wobbler to determine the angular position of the wobbler. The piston portion 52 of the control cam 51, in cooperation with the shoulder 20, forms a hydraulic means which, as presently will become more apparent, is utilized to place the wobbler under a pre-load of a predetermined constant pressure. The angular position of the wobbler 17 is determined by longitudinal shift of the control cam 51. Shift to the right is, of course, limited and determined by contact of the cam with the member 37 of the wobbler throughout its entire circumference, the wobbler in this position being disposed strictly at right angles to the shaft in an absolute zero or no-stroke position. Shift of the control cam to the left, as viewed in Fig. 1, is limited by abutment of the end of the cam with the shoulder 22.

Shift of the wobbler from one side to the other of its neutral position to obtain reversal of operation of the pump, that is reversal in the direction of fluid discharge, is obtained by means operating independently of the control cam 51. Herein this means is hydraulic and comprises an annular piston 55 fixedly secured on the shaft 26 by means such as a pin 56. Cooperating with the piston is a cylinder 57 having a narrow extension 58 slidable in a groove 59 formed in the periphery of the shaft for that purpose. Extending radially from the extension 59 is an arm 60 received in a suitable socket 61 formed in the inner member 35 of the wobbler.

Passages for the supply of operating fluid to opposite ends of the cylinder 57 are formed in part in the shaft 26. To that end, the shaft is formed with an axial bore 62 terminating at one end in a portion 63 of slightly reduced diameter. Inserted into the bore is a tube 64 fitting snugly into the bore 62 at its left hand end, but reduced throughout the major portion of its length to the diameter of the reduced portion 63 of the bore, and projecting into the reduced portion 63 so as to define with the bore 62 an annular passage 65. This annular passage 65 is by a radial passage 66 connected to the left hand end of the cylinder 57 at a point immediately adjacent the piston 55. A similar radial passage 67 opens to the right hand end of the cylinder 57 immediately adjacent the piston 55 and communicates at its inner end with the interior of the tube 64. At its left hand end, the annular passage 65 is connected by a radial passage 68 to an annular groove 69 formed internally of a sleeve or bushing 70 in the reduced portion 23 of the stepped bore. Spaced from the groove 69 is a similar groove 71 connected by a radial passage 72 to the interior of the tube 64. The grooves 69 and 71 are supplied with control fluid, as hereinafter more particularly described.

The motor M is also of the wobbler type and is generally similar to the pump P. Like the pump, it is comprised in the main of a cylinder block 75 having formed therein a plurality of annularly arranged and longitudinally extending cylinders 76, each of which opens at its inner or right hand end, as viewed in Fig. 1, through a port 77 to the recess 13. Reciprocable in each of the cylinders is a piston 78, at all times projecting through the end of the cylinder opposite the port 77. The inner or right hand end wall of the cylinder block 75 cooperates with the recess 13 to form a valve chamber. The outer or left hand end of the cylinder block is partially and non-rotatably received within a casing member 79 which projects through the open end of the main housing portion 6 and is formed with an outwardly projecting radial flange 80 for closing the opening.

Formed in the cylinder block 75 is a longitudinally extending bore 81, and extending longitudinally of the motor centrally of the bore 81 is a shaft 82 projecting at its left end, as viewed in Fig. 1, outwardly of the casing member 80 and the housing 5. The shaft 82 is journaled at its inner end in a ball bearing 83 and is also journaled intermediate its ends in a ball bearing 84. Near its outer end, it is provided with a sleeve 85 having a radially outwardly projecting flange 86. An annular ring 87 is mounted in the casing member 80, and interposed between the ring and the sleeve is a roller bearing 88, and interposed between the ring and the flange 86 is a roller bearing 89, respectively supporting the shaft against radial and end thrust. Surrounding the shaft and closing the opening in the casing member 80, through which the end of the shaft projects, is a conventional seal 90.

Pivotally mounted on the shaft 82 on a pin 93 is a wobbler, generally designated 94, identical with the wobbler 17 of the pump. The angular position of the wobbler with respect to the shaft 82, and hence the displacement of the motor, is governed by a bar 95 slidable longitudinally of the shaft in a groove 96. Intermediate its ends, the bar is provided with an arm 97 terminating in a rounded head 98 received in a socket 99 approximately formed in the wobbler 94. At its inner end the bar 95 is engaged with the inner race 100 of ball bearings 101, the outer race of which is formed by an extension 102 of an annular member 103 slidable and rotatable relative to the shaft 82. The member 103 is shifted longitudinally of the shaft to vary the displacement only of the motor by means presently to be described.

The flow of fluid from the pump to the motor is controlled by a wheel-like valve 105 identical with the valve 42. This valve operates in the valve chamber 13 and is driven in timed relation with the reciprocation of the pistons by the shaft 82. As best seen in Fig. 1b, there projects eccentrically from the end of the shaft and into the chamber 13 a stud 106. This stud is received in a ball bearing 107 interposed between the stud and the valve.

Advantage is taken of the novel governing means for the wobblers, particularly that of the pump, to provide a unique control means determining the speed of operation of the motor for a given speed of operation of the pump. This means, as stated, is a common means, and, moreover, is a positively interconnected means without lost motion. The means comprises a rod 110 slidably mounted longitudinally of the transmission in a bore 111 formed in an extension of the valve block 11. At its right hand end, as viewed in Fig. 1, the rod 110 passes through one end of a rod 112 extending at right angles thereto. This rod 112 is adjustably but rigidly secured on the rod 110 by nuts 113 and 113', the latter being formed with a radially projecting flange 113'' for abutment by a shift limiting or position determining means later to be described. The free end of the rod 112 projects into a socket 114 in the annular member 51. Preferably an additional guide means for the rod 110 is provided which herein takes the form of a piston 115 through which the rod 112 projects, and to which it is secured by a set screw 116. This piston is a double ended piston operating in bores 117 and 118 formed, respectively, in the cylinder block 9 and the casing member 10. At its left hand end the rod 110 is operatively connected to the upper end of a lever 119 pivotally mounted intermediate its ends on a pin 120 journaled in the motor cylinder block 75. At its lower end the lever 119 terminates in a rounded head 122 which projects in a socket 123 formed in the annular member 103 of the governing means for the wobbler 94.

While the rod 110 might be shifted in a variety of ways, in the form of the invention shown in Figs. 1 to 3, it is adapted to be shifted by hydraulic means later to be described. Likewise, the member 103 is shifted by hydraulic means but in direct proportion and in direct response to shift of the rod 110, this hydraulic means serving as a direct connecting means as well as an aiding means. As a matter of fact, member 103 is shifted by hydraulic servo means of which the rod 110 forms the governing part. More particularly, the valve block 11 has secured thereto a cylinder 124 in which is reciprocable a piston 125 having an axial bore 126 extending therethrough. Projecting slidably through the bore in the piston 125 is one end of the rod 110 which also projects slidably into and closes a bore 124' in the remote or outer end of the cylinder 124. Intermediate its ends the piston is formed with a recess 128 into which the upper end of the lever 119 projects, the cylinder 124 being formed with a slot 130 to accommodate the lever 119 and its movements.

As above stated, the cylinder 124 and the piston 125 are parts of a servo means which is completed and controlled by the rod 110. Fluid is supplied to the ends of the cylinder 124 through the rod 110 which, for that purpose, is formed, as best seen in Fig. 3, with an axial passage 129, an external annular groove 131 approximately midway of its ends, and radial ports 132 connecting the groove with the passage. Opposite the groove 131, the bore 111 in the valve block is formed with an elongated recess or port 133, so as to be in communication with the groove 131 in all positions of the rod 110. Outwardly of the groove 131, rod 110 is formed with a pair of radial, axially spaced ports 134 interconnected by a longitudinally extending groove 134' and diametrically opposite thereto a similar pair of ports 135 interconnected by a groove 135'. On either side of the ports 134 and 135, rod 110 is formed with wide annular and external grooves 136 and 136'.

Piston 125 in turn is formed with an inwardly opening radial port 137 located to the right of the center of the piston, as viewed in Fig. 3, but communicating with the left end of the cylinder 124 through a passage 137'. Formed in the piston to the left of its center is an inwardly opening radial port 138 communicating with the right end of the cylinder 124 through a passage 138'. The ports 137 and 138 are precisely equal in diameter to the width of the land formed between the grooves 136 and 136' and the adjacent radial port. The ports 137 and 138 are, moreover, so spaced with respect to the lands on the rod 110 that both may be closed as shown in Fig. 3. Shift of the rod 110 from the position shown will cause one of the ports in the piston to be connected to the passage 129 and thus receive fluid under pressure while the other port will be connected to one of the annular recesses in the rod. These recesses 136 and 136' are constantly connected to tank for the discharge of fluid through the passages 139 in the piston 125 (see Fig. 2) and an internal annular recess 139' in the cylinder 124. The mechanism operates in well known manner with the piston following the movement of the rod 110 in the same direction and to the same extent.

It will be seen that there is thus provided a common physically interconnected and positively acting control means for governing the displacement of both the pump and the motor simultaneously. Moreover, this control means acts to increase the displacement of the motor as the displacement of the pump is decreased, so as to obtain larger torques and lower speeds of the motor for feed rates of operation, and to decrease the displacement of the motor as the displacement of the pump is increased to obtain lower torques with increased speeds of the motor for rapid transverse operation. Such a common control means is made possible by the construction of the governing means for the pump, in which adjustment of the wobbler to govern the direction of fluid discharge by the pump and adjustment of the wobbler to govern the displacement of the pump is effected by physically separate and independent but functionally cooperating means and, more particularly, in which the displacement governing means has a common direction of movement for increase or decrease in displacement regardless of the direction of discharge of the pump.

The control means may be governed in a variety of ways, including hydraulic valve means. Such control by hydraulic valve means and, more particularly, by a servo control valve means is shown in Fig. 2, which is a diagrammatic disclosure of a hydraulic circuit in which the transmission is incorporated. Such a circuit includes a make-up pump generally designated MP for supplying make-up fluid to the closed circuit between the pump and the motor and control fluid for actuating the various hydraulic devices described. This make-up pump is of the rotary gear element type disclosed and claimed in my Patent No. 2,132,813, dated October 11, 1938, and comprises generally (see Figs. 1 and 2) an inner gear element 140 fixed on the shaft 26 to be driven thereby, an outer gear element 141, and a crescent shaped dividing member 142. The elements operate in a chamber formed by the outer end face of the casing member 10 and an end closure 143 secured by bolts 144 to the casing member 10. Fluid is drawn into the pump through an intake passage, generally designated 145 (see Fig. 2), and composed of a bore 145' in the casing member 10 and a conduit 145''. The passage communicates at one end with the tank T and terminates at the other end in an enlarged recess 146 forming the intake port for the make-up pump. A strainer 147 preferably is interposed in the intake passage. A similar enlarged recess 148 forms the discharge port for the make-up pump, and leading from this recess is a make-up and control fluid supply passage 149 terminating in a threaded port 150.

The circuit also includes a pair of high pressure relief valve means, generally designated 151 and 152, a pair of check valves, generally designated 153 and 154, a control fluid pressure governing valve means, generally designated 155, and a pressure reducing valve means, generally designated 156. These valve means are all described in greater particularity in my above-mentioned Patent No. 2,383,092. Suffice it to say, therefore, that each of the high pressure valve means comprises a bore 157 opening to the end of which, through an annular seat 158, is a port 159, and opening to the side of which is a port 160. Co-operating with the seat 158 is a disk valve 161 urged to seated position by a strong compression spring 162. Each of the check valve means comprises a bore 163 opening to the end of which, through an annular valve seat 164, is a port 165, and opening to the other end of which is a port 166. The disk valve 167 is urged to seating position by a light compression spring 168. The control pressure governing valve means 155 is formed with three bores 169, 170 and 171, successively decreasing in diameter. Reciprocable in the first bore is a piston valve 172 urged toward engagement with a boss 173 by a light compression spring 174. Reciprocable in the bore 170 is a plunger 175 having a reduced portion 176 reciprocable in the bore 171. The area of the end of the reduced portion 176 and of the annular shoulder formed on the plunger 175 surrounding the reduced portion 176 are equal. Opening to the annular chamber formed about the boss 173, so as to be constantly open, is a port 177, and opening to the opposite end of the bore 169, and also always open, is a port 178. Opening to the side of the bore 169 spaced inwardly somewhat from the end carrying the boss 173, so as to be controlled by the piston valve 172, is a port 179. This port, as clearly seen in Fig. 2, is closed when the piston valve 172 abuts the boss 173. Opening to the end of the bore 170 is a port 180, and opening to the end of the bore 171 is a port 181. The pressure reducing valve comprises a bore 182 in which is reciprocable a cylindrical valve 183. The valve is formed intermediate its ends with an annular groove 184, and extending longitudinally of the valve are a plurality of passages 185 opening at one end to the groove 184 and at the other end opening through the end of the valve. The valve is urged by a compression spring 186 to abut a boss 187. Opening to the annular chamber formed about the boss 187 is a port 188, and opening to the side of the bore 182 is a port 189 controlled by the valve 183. The port 189 is so located that it registers with the groove 184 when the valve abuts the boss 187, and is gradually closed as the valve is shifted away from the boss against the action of the spring 186. The valves just described can all conveniently be located directly in the transmission proper, usually the valve block 11, in much the same manner more fully disclosed in my above-mentioned Patent No. 2,383,092.

Not disclosed in my above mentioned application, and not incorporated directly in the transmission, is a directional control valve means, generally designated 192. This valve means comprises a casing 193 having a bore 194. Reciprocable in the bore 194 is a cylindrical valve 195 projecting at one end and at that end carrying a knob 196 for manual actuation. The valve has three positions, namely, neutral, forward and reverse, and is retained in its positions by a spring pressed detent 197 adapted to engage notches 198 formed in the valve. The valve is provided with three annular grooves 200, 201 and 203, of which 200 and 203 are of equal width, while the intermediate groove 201 is somewhat wider. Opening to the bore 194 are pairs of ports 204 and 205, and 206 and 207, the ports 204 and 206 opening to the bore through annular grooves 208 and 209, respectively. Opening to the bore intermediate the grooves 208 and 209 is a supply port 210. The ports are so spaced longitudinally of the valve casing and relative to the valve 195 that the pairs of ports will be bridged by the grooves 200 and 203 when the valve is in neutral position, shown in Fig. 2. The supply port 210 under that condition is cut off from either the groove 208 or 209. When shifted upwardly, as viewed in Fig. 2, which is the reverse position, the intermediate groove 201 will bridge the ports 204 and 210 and will interrupt communication between the ports 204 and 205 while maintaining communication between the ports 206 and 207. Similarly, when the valve 195 is shifted downwardly, that is, to its forward position, port 206 is connected to the supply port 210 with port 207 cut off from the port 206 and the ports 204 and 205 still bridged.

The servo-control valve means, generally designated 215, comprises a casing 216 having an enlarged bore 217 forming a cylinder and reduced bores 218 and 219 opening, respectively, through the lower and upper ends of the casing, as viewed in Fig. 2. Reciprocable in the enlarged bore 217 is a piston 220 which in turn is formed with an axial bore 221. Reciprocable in this bore 221 of the piston is a valve 222 which projects slidably through the bore 219 in the upper end of the casing and outwardly of the casing where it is formed with an actuating head 223. Near its actuating head 223 the valve is formed with an external annular groove 224, which groove is connected by radial ports 225 to a passage 226 extending longitudinally of the valve. The upper end of the casing in turn is formed with a wide annular groove 227 opening to the bore 219 and so positioned as to be in communication with the groove 224 in all positions of adjustment of the valve 222. Opening to this groove 227 is a port 229 which constitutes the fluid supply port, as will presently become more apparent.

Intermediate the radial ports 225 and the opposite end of the valve, the valve is provided with elongated, radial, slot-like ports 230 and 230' disposed diametrically opposite each other. On either side of the ports 230, 230' the valve is formed with comparatively wide external annular recesses 231 and 231'. The passage 226 is closed by a plug 232 at some point between the ports 230, 230' and the inner end of the valve.

Cooperating with the ports and recesses formed in the valve are a pair of inwardly opening radial ports 233 and 233' formed in the piston 220. Port 233, though disposed lower than the port 233', as viewed in Fig. 2, communicates with the upper end of the bore 217 through a passage 234, while port 233' communicates with the lower end of the bore 217 through a passage 234'. The ports 233, 233' have a diameter exactly equal to the width of the lands formed between the ports 230, 230' and the recesses 231, 231' and, moreover, are so spaced that both may be completely closed simultaneously, as shown in Fig. 2. Also formed in the piston 220, as best seen in Fig. 4, are a pair of radial passages 235 which are constantly in communication with the recesses 231, 231' and which open to and are constantly in communication with a very wide annular recess 235' formed in the casing 216 and adapted to be connected to tank. It is believed readily understood from the foregoing that the valve will operate in the well known manner of a servo valve, that is, with a shift of the valve 222 in either direction from the position shown in Fig. 2, one of the ports 233, 233', depending upon the direction of shift, will be connected to the passage 226 and thus supplied with fluid under pressure, while the other of the ports 233, 233' will be connected to one of the recesses 231, 231' to permit fluid to be exhausted from the opposite end of the bore 217. The piston 220 will, therefore, follow the valve 222 and partake of movement in the same direction and to the same degree as is given to the valve.

Reciprocable in and projecting through the bore 218 in the lower end of the valve casing is a plunger pin 228, also reciprocable in the lower end of the bore 221 in the piston 220 and limited as to its movement into the piston by an annular shoulder 228'. Pivotally mounted on the transmission as by a pin 236 is an arcuate direction changing member 237. The one end of the member bears against the projecting end of the plunger pin 228, while the other end of the member bears against the flange 113'' of the nut 113'.

The various valve means, as well as the hydraulic devices described, are connected in circuit in the following manner: Leading from the port 150 to the port 177 of the control fluid pressure governing valve means 155 is a conduit 240. A first branch conduit 241 leads to the port 189 of the pressure reducing valve means 156 and a second branch conduit 242 leads to the port 229 of the servo-control valve means, and by a further branch 243 to the supply port 210 of the directional control valve means. Excess control and make-up fluid discharged through the port 179 of the valve means 155 is returned to the tank through a conduit 244 discharging to the interior of the pump casing, whence it flows through the casing and to the tank through a port 245 formed in the bottom of the casing member 10 and a conduit 246. A branch conduit 247 of the conduit 244 leads to the motor casing, whence the fluid flows through the casing and out through a port 248 forming the bottom of the casing member 79 and a conduit 249 to the tank. Fluid at constant pressure maintained by the valve means 156 and available at port 188 is conducted by a conduit 250 to the space between the shoulder 20 and the piston portion 52 of the annular control member 51. A branch conduit 251 leads to the port 178 of the valve means 155. Also leading from the conduit 250 is a conduit 252 leading to the annular passage 48 in the valve block 11. Interposed in this conduit is the check valve 153 so disposed that fluid may flow from the conduit 250 to the annular passage 48, but not in the reverse direction. A branch 253 of the conduit 252 leads to the passage 49 connecting the peripheries of the chambers 12 and 13. Interposed in this conduit is the check valve means 154, again so disposed as to permit flow from the conduit 250 to the passage 49 but to prevent reverse flow. Conduit 252 is by a branch conduit 254 connected to the port 181 of the valve means 155 and by another branch conduit 255 connected to the port 160 of the high pressure relief valve means 152, and by still another branch conduit 256 to the port 159 of the high pressure relief valve means 151. Similarly, conduit 253 is by a branch conduit 257 connected to the port 180 of the valve means 155, by another branch conduit 258 connected to the port 159 of the high pressure relief valve means 152, and by still another branch conduit 259 to the port 160 of the high pressure relief valve means 151.

Fluid is supplied to the passage 129 in the rod 110 through a conduit 262 which leads from the conduit 243 to the port 133. Exhaust fluid from either end of the cylinder 124 is, as already described, discharged through one of the passages 139, groove 139' to aperture 130 in the bottom of the cylinder 124 whence it flows into the motor casing and eventually is returned to tank through conduit 249. The directional control valve means 192 governs the control of fluid to the means for shifting the wobbler 17 of the pump from one side of neutral to the other, and to that end there leads from the port 204 to the annular groove 71 a conduit 264, and from the port 206 to the annular groove 69 a conduit 265. The ports 205 and 207 are connected to tank through conduits 266 and 267.

It is believed that the operation of the transmission as incorporated in the system will be apparent from the above description. Moreover, inasmuch as only the control means is herein claimed, any résumé of the operation will be limited and confined largely to the control means. Let it be assumed that the pump is being driven and that the directional control valve means is in its neutral position, as shown, and that the servo-control valve means is also in the position shown, which is the position corresponding to the zero stroke of the wobbler, hence that no operation of the transmission is obtained. With the parts in the positions stated, rotation of the shaft 26 of the pump P will cause operation of the make-up pump MP supplying the necessary make-up and control fluid. The wobbler 17 also would be driven, but inasmuch as the directional control valve means is in neutral position no fluid would be supplied to either end of the cylinder 57, and hence the wobbler would remain in its neutral or no-stroke position and no discharge from the pump would take place. If now the valve 195 is shifted to its forward position, control fluid would be supplied to the conduit 265 and thus to the left hand end of the cylinder 57, causing the extension 58 thereof to tend to tilt the wobbler in a counterclockwise direction, as viewed in Figs. 1 and 3. This shift, however, still does not take place so long as the servo-control valve means is in position corresponding to zero stroke of the wobbler.

Should the valve 22 now be shifted out even slightly, fluid will be supplied to the lower end of the bore 217 through port 230' and passage 234' and will shift the piston 220 an amount corresponding to the shift of the valve 222. This shift of the piston 222 will permit inward movement of the plunger pin 228, thereby permitting shift to the left of rod 110 and control member 51. The pressure of the fluid acting in the cylinder 57 will cause the wobbler, the control member 51, and rod 110 to move to the extent permitted by shift of the plunger pin 228, and thus the wobbler will be tilted somewhat from its strictly right angular position and cause the pump to operate with small displacement. The various hydraulic devices are designed so that the force of the fluid acting in the cylinder 57 is greater than the sum of the forces produced by the preloading and the reaction of the pistons 16 on the wobbler 17. Thus the wobbler 17 will always be held in contact with the end of the control member 51 which in turn will assume the position determined by the plunger pin 228 and ultimately by the adjustment of the servo-control valve means.

Simultaneously with the adjustment of the pump wobbler, the rod 110 also adjusts the motor wobbler through its connection with the lever 119. Shift of the rod 110 to the left (Fig. 3) will cause pressure fluid to be supplied to the right hand end of cylinder 124 from passage 129 through port 135, port 138 and passage 138'. This will shift piston 125 to the left to the same extent that rod 110 was shifted. Through lever 119, member 103 and extension 97, the motor wobbler will be tilted to decrease the displacement. The transmission is now operating at a low feed rate.

If the servo-control valve is shifted outwardly to the limit of its movement to its maximum speed position, the piston 220 will be shifted upwardly a like amount. Such movement of the piston 220 will permit tilting of the pump wobbler until the member 51 abuts and is arrested by the shoulder 22, thereby adjusting the pump to maximum displacement without in any way disturbing the pump for forward operation. This shift of the member 51 will shift rod 110 which through its hydraulic connection will adjust the wobbler of the motor to near zero displacement. With the pump now operating at maximum displacement and the motor at minimum displacement, rapid traverse operation of the transmission is obtained.

With the transmission operating either in rapid traverse or in feed, the directional control valve means may be shifted from forward to reverse or vice versa without change in the displacement adjustment of either the pump or the motor.

In Fig. 5 there is disclosed a modified construction forming a part of the governing means for the control means. The construction disclosed in Fig. 5 provides for the manual adjustment of the feed and traverse positions of the control means and displaces the servo-control valve means. The means comprises simply a shaft 270 threadedly received in a sleeve 271 secured in the housing 5 of the transmission. On its outer end the shaft has non-rotatably fixed thereon, as by a pin 272, a hand wheel 273. At its inner end the shaft is formed with a bore 274 and rotatable in the bore is a plunger 275 which bears against one end of the arcuate direction changing member 237'. The end thrust of the plunger 275 is taken by a ball bearing 276 interposed between the inner end of the plunger and the bottom of the bore 274. The plunger is retained against loss out of the end of the shaft by means of a pin 277 engaging a groove 278 in the plunger.

The direction changing member 237' is identical with its construction in the first form and is pivotally mounted on a pin 236'. One end of the member bears against the plunger 275 while the other end bears against the nut 113'. With the direction changing means of the pump constantly urging the wobbler, and hence the control member 51, toward increased displacement of the pump, the direction changing member 237' will at all times be urged against the plunger 275 and thus the displacement of the pump may at all times be controlled by the adjustment of the hand wheel 273.

I claim as my invention:

1. A hydraulic transmission comprising, in combination, a hydraulic motor device, a hydraulic pump device supplying operating fluid to said motor device, one of said devices having an annularly arranged series of piston and cylinder means, a shaft extending centrally of said series of piston and cylinder means, and a wobbler pivotally mounted on said shaft and engaged by the pistons of said means, and control means to govern the rate and direction at which said motor device is driven by said pump device comprising an annular control member surrounding the shaft of said device having the annularly arranged series of piston and cylinder means and providing an annular guide surface on which the wobbler bears to determine the displacement, a second control member operatively engaging said wobbler to reverse the angular position of said wobbler with respect to the shaft, a third control member for governing the displacement only of the other of said devices, and means interconnecting said last mentioned control member and said annular member simultaneously to adjust the displacement of said devices.

2. A hydraulic transmission comprising, in combination, a hydraulic motor device, a hydraulic pump device supplying operating fluid to said motor device, one of said devices having an annularly arranged series of piston and cylinder means, a shaft extending centrally of said series of piston and cylinder means, and a wobbler pivotally mounted on said shaft and engaged by the pistons of said means, and control means to govern the rate and direction at which said motor device is driven by said pump device comprising an annular control member surrounding the shaft of said device having the annularly arranged series of piston and cylinder means and providing an annular guide surface on which the wobbler bears to determine the displacement, a second control member operatively engaging said wobbler to reverse the angular position of said wobbler with respect to the shaft, a third control member for governing the displacement only of the other of said devices, and means interconnecting said last mentioned control member and said annular member simultaneously and proportionately to increase or decrease the displacement of one of said devices respectively as the displacement of the other of said devices is decreased or increased.

3. A hydraulic transmission comprising, in combination, a hydraulic motor device, a hydraulic pump device supplying operating fluid to said motor device, one of said devices having an annularly arranged series of piston and cylinder means, a shaft extending centrally of said series of piston and cylinder means, and a wobbler pivotally mounted on said shaft and engaged by the pistons of said means, and control means to govern the rate and direction at which said motor device is driven by said pump device comprising an annular control member surrounding the shaft of said device having the annularly arranged series of piston and cylinder means and providing an annular guide surface on which the wobbler bears to determine the displacement, a second control member operatively engaging said wobbler to reverse the angular position of said wobbler with respect to the shaft, a third control member for governing the displacement only of the other of said devices, and means governing the displacement of said devices comprising a slidably mounted member, a rod extending transversely of said sliding member and into engagement with said annular control member, and a lever pivoted intermediate its ends connected at one end to said sliding member and at the other end to said third control member.

4. A hydraulic transmission comprising, in combination, a hydraulic motor device, a hydraulic pump device supplying operating fluid to said motor device, one of said devices having an annularly arranged series of piston and cylinder means, a shaft extending centrally of said series of piston and cylinder means, and a wobbler pivotally mounted on said shaft and engaged by the pistons of said means, and control means to govern the rate and direction at which said motor device is driven by said pump device comprising an annular control member surrounding the shaft of said device having the annularly arranged series of piston and cylinder means and providing an annular guide surface on which the wobbler bears to determine the displacement, a second control member operatively engaging said wobbler to reverse the angular position of said wobbler with respect to the shaft, a third control member for governing the displacement only of the other of said devices, and means governing the displacement of said devices comprising a slidably mounted member, a rod extending transversely of said sliding member and into engagement with said annular control member, a lever pivoted intermediate its ends connected at one end to said sliding member and at the other end to said third control member, and hydraulic means for shifting said slidably mounted member.

5. A hydraulic transmission comprising, in combination, a hydraulic motor device, a hydraulic pump device supplying operating fluid to said motor device, one of said devices having an annularly arranged series of piston and cylinder means, a shaft extending centrally of said series of piston and cylinder means, and a wobbler pivotally mounted on said shaft and engaged by the pistons of said means, and control means to govern the rate and direction at which said motor device is driven by said pump device comprising an annular control member surrounding the shaft of said device having the annularly arranged series of piston and cylinder means and providing an annular guide surface on which the wobbler bears to determine the displacement, a second control member operatively engaging said wobbler to reverse the angular position of said wobbler with respect to the shaft, a third control member for governing the displacement only of the other of said devices, and means governing the displacement of said devices comprising a slidably mounted member, a rod extending transversely of said sliding member and into engagement with said annular control member, a lever pivoted intermediate its ends connected at one end to said sliding member and at the other end to said third control member, hydraulic means for shifting said slidably mounted member, and valve means governing the supply of operating fluid to said hydraulic means.

6. A hydraulic transmission comprising, in combination, a hydraulic motor device, a hydraulic pump device supplying operating fluid to said motor device, one of said devices having an annularly arranged series of piston and cylinder means, a shaft extending centrally of said series of piston and cylinder means, and a wobbler pivotally mounted on said shaft and engaged by the pistons of said means, and control means to govern the rate and direction at which said motor device is driven by said pump device comprising an annular control member surrounding the shaft of said device having the annularly arranged series of piston and cylinder means and providing an annular guide surface on which the wobbler bears to determine the displacement, a second control member operatively engaging said wobbler to reverse the angular position of said wobbler with respect to the shaft, a third control member for governing the displacement only of the other of said devices, and means governing the displacement of said devices comprising a slidably mounted member, a rod extending transversely of said sliding member and into engagement with said annular control member, a lever pivoted intermediate its ends connected at one end to said sliding member and at the other end to said third control member, hydraulic means for shifting said slidably mounted member, and servo-valve means governing the supply of operating fluid to said hydraulic means.

7. A hydraulic transmission comprising, in combination, a hydraulic motor device, a hydraulic pump device supplying operating fluid to said motor device, one of said devices having an annularly arranged series of piston and cylinder means, a shaft extending centrally of said series of piston and cylinder means, and a wobbler pivotally mounted on said shaft and engaged by the pistons of said means, and control means to govern the rate and direction at which said motor device is driven by said pump device comprising an annular control member surrounding the shaft of said device having the annularly arranged series of piston and cylinder means and providing an annular guide surface on which the wobbler bears to determine the displacement, a second control member operatively engaging said wobbler to reverse the angular position of said wobbler with respect to the shaft, a third control member for governing the displacement only of the other of said devices, and means governing the displacement of said devices comprising a slidably mounted member, a rod extending transversely of said sliding member and into engagement with said annular control member, a lever pivoted intermediate its ends connected at one end to said sliding member and at the other end to said third control member, and manually operable mechanical means limiting the shift of said slidably mounted member in one direction.

8. A hydraulic transmission comprising, in combination, a first hydraulic device having an annularly arranged series of piston and cylinder means, a shaft extending centrally of said series of piston and cylinder means, and a wobbler pivotally mounted on said shaft and engaged by the pistons of said means, a second hydraulic device for supplying operating fluid to said first hydraulic device having an annularly arranged series of piston and cylinder means, a shaft extending centrally of said means and a wobbler pivotally mounted on said shaft and engaging the pistons of said means, a hydraulic circuit connecting said devices, and control means to govern the rate and direction at which said first device is driven by said second device comprising an annular control member surrounding the shaft of one of said devices and providing an annular guide surface on which the wobbler of the one device bears to determine the displacement of said device, a second control member acting independently of said annular member operatively engaging the wobbler of the one device to reverse the angular position of said wobbler with respect to the shaft, a third control member for the wobbler of the other of said devices, and means positively interconnecting said last mentioned control member and said annular member simultaneously and proportionately to increase or decrease the displacement of one of said devices respectively as the displacement of the other of said devices is decreased or increased.

9. A hydraulic transmission comprising, in combination, a hydraulic motor device, a hydraulic pump device supplying operating fluid to said motor device, one of said devices having an annularly arranged series of piston and cylinder means, a shaft extending centrally of said series of piston and cylinder means, and a wobbler pivotally mounted on said shaft and engaged by the pistons of said means, and control means to govern the rate and direction at which said motor device is driven by said pump device comprising an annular control member surrounding the shaft of said device having the annularly arranged series of piston and cylinder means and providing an annular guide surface on which the wobbler bears to determine the displacement, a second control member for governing the displacement only of the other of said devices, and means interconnecting said last mentioned control member and said annular member simultaneously to adjust displacement of said devices.

10. A hydraulic transmission comprising, in combination, a hydraulic motor device, a hydraulic pump device supplying operating fluid to said motor device, one of said devices having an annularly arranged series of piston and cylinder means, a shaft extending centrally of said series of piston and cylinder means, and a wobbler pivotally mounted on said shaft and engaged by the pistons of said means, and control means to govern the rate and direction at which said motor device is driven by said pump device comprising an annular control member surrounding the shaft of said device having the annularly arranged series of piston and cylinder means and providing an annular guide surface on which the wobbler bears to determine the displacement, a second control member for governing the displacement only of the other of said devices, and means governing the displacement of said devices comprising a slidably mounted member, a rod extending transversely of said sliding member and into engagement with said annular control member, and a lever pivoted intermediate its ends connected at one end to said sliding member and at the other end to said second control member.

11. A hydraulic transmission comprising, in combination, a piston motor including a wobbler, a piston pump including a wobbler for supplying operating fluid to said motor, a hydraulic circuit connecting said pump and said motor and control means to govern the rate and direction at which said motor is driven by said pump comprising governing means for the wobbler of said motor and the wobbler of said pump determining the displacement thereof interconnected to form a common means having a positive connection effective in all directions of permissible movement, hydraulically operable means for limiting the shift of said common means in a direction increasing displacement of said pump, and means physically separate from said displacement determining means acting on one of the wobblers to govern the direction of operation of said motor and to urge said displacement governing means to the limit determined by said hydraulically operable means.

12. A hydraulic transmission comprising, in combination, a piston motor including a wobbler, a piston pump including a wobbler for supplying operating fluid to said motor, a hydraulic circuit connecting said pump and said motor, a first means for adjusting the displacement of said pump, a second means for adjusting the displacement of said motor, servomotor means for interconnecting said first and second means, and means acting on one of said first or second means to control the same.

13. A hydraulic transmission comprising, in combination, a piston motor including a wobbler, a piston pump including a wobbler for supplying operating fluid to said motor, a hydraulic circuit connecting said pump and said motor, a first means for adjusting the displacement of said pump, a second means for adjusting the displacement of said motor, servomotor means, for interconnecting said first and second means, governed by said first means, and means acting on said first means to control the same.

14. A hydraulic transmission comprising, in combination, a piston motor including a wobbler, a piston pump including a wobbler for supplying operating fluid to said motor, a hydraulic circuit connecting said pump and said motor, a first means for adjusting the displacement of said pump, a slidably mounted valve carried by said first means, a second means for adjusting the displacement of said motor, a servomotor controlled by said valve interconnecting said means, and means governing the position of said first means and the valve carried thereby.

15. A hydraulic transmission comprising, in combination, a piston motor including a wobbler, a piston pump including a wobbler for supplying operating fluid to said motor, a hydraulic circuit connecting said pump and said motor, a first means for adjusting the displacement of said pump, a slidably mounted valve carried by said first means, a second means for adjusting the displacement of said motor, a servomotor controlled by said valve interconnecting said means, and servo valve means governing the position of said first means.

16. A hydraulic transmission comprising, in combination, a piston motor including a wobbler, a piston pump for supplying operating fluid to said motor also including a wobbler, a hydraulic circuit connecting said pump and said motor, and control means to govern the rate and direction at which said motor is driven by said pump comprising means acting on one of the wobblers to govern the direction of operation of said motor by tilting the wobbler to one or the other side of neutral, an adjustable displacement determining member engageable by said one of the wobblers to determine the extent of tilt thereof by said last mentioned means in either direction away from neutral whereby said member has a single position of adjustment for any given tilt of said one wobbler regardless of the direction of tilt thereof, and common means for controlling the adjustment of both said member and the extent of tilt of the remaining wobbler.

17. A hydraulic transmission comprising, in combination, a piston motor including a wobbler, a piston pump for supplying operating fluid to said motor also including a wobbler, a hydraulic circuit connecting said pump and said motor, and control means to govern the rate and direction at which said motor is driven by said pump comprising means acting on one of the wobblers to govern the direction of operation of said motor by tilting the wobbler to one or the other side of neutral, an adjustable displacement determining member engageable by said one of the wobblers to determine the extent of tilt thereof by said last mentioned means in either direction away from neutral whereby said member has a single position of adjustment for any given tilt of said one wobbler regardless of the direction of tilt thereof and common and positively interconnected means for controlling the adjustment of both said member and the extent of tilt of the remaining wobbler.

18. A hydraulic transmission comprising, in combination, a piston motor including a wobbler, a piston pump for supplying operating fluid to said motor also including a wobbler, a hydraulic circuit connecting said pump and said motor, and control means to govern the rate and direction at which said motor is driven by said pump comprising means acting on one of the wobblers to govern the direction of operation of said motor by tilting the wobbler to one or the other side of neutral, an adjustable displacement determining member engageable by said one of the wobblers to determine the extent of tilt thereof by said last mentioned means in either direction away from neutral whereby said member has a single position of adjustment for any given tilt of said one wobbler regardless of the direction of tilt thereof, means interconnecting said adjustable member and the remaining wobbler for effecting simultaneous and proportional adjustment thereof, and a single governing means acting on said interconnecting means determining the extent of adjustment of said member and the remaining wobbler.

19. A hydraulic transmission comprising, in combination, a piston motor including a wobbler, a piston pump for supplying operating fluid to said motor also including a wobbler, a hydraulic circuit connecting said pump and said motor, and control means to govern the rate and direction at which said motor is driven by said pump comprising means acting on one of the wobblers to govern the direction of operation of said motor by tilting the wobbler to one or the other side of neutral, an adjustable displacement determining member engageable by said one of the wobblers to determine the extent of tilt thereof by said last mentioned means in either direction away from neutral whereby said member has a single position of adjustment for any given tilt of said one wobbler regardless of the direction of tilt thereof, and common means for controlling the adjustment of both said member and the extent of tilt of the remaining wobbler including an interconnection between said adjustable member and the remaining wobbler, said interconnection including hydraulic means for aiding in the adjustment of the remaining wobbler.

20. A hydraulic transmission comprising, in combination, a piston motor including a wobbler, a piston pump for supplying operating fluid to said motor also including a wobbler, a hydraulic circuit connecting said pump and said motor, and control means to govern the rate and direction at which said motor is driven by said pump comprising means acting on one of the wobblers to govern the direction of operation of said motor by tilting the wobbler to one or the other side of neutral, an adjustable displacement determining member engageable by said one of the wobblers to determine the extent of tilt thereof by said last mentioned means in either direction away from neutral whereby said member has a single position of adjustment for any given tilt of said one wobbler regardless of the direction of tilt thereof, and common means for controlling the adjustment of both said member and the extent of tilt of the remaining wobbler comprising interconnecting means between said adjustable member and the remaining wobbler including hydraulic means for aiding in the adjustment of the remaining wobbler and hydraulically operable means for governing the adjustment of said interconnecting means.

21. A hydraulic transmission comprising, in combination, a piston motor including a wobbler, a piston pump for supplying operating fluid to said motor also including a wobbler, a hydraulic circuit connecting said pump and said motor, and control means to govern the rate and direction at which said motor is driven by said pump comprising means acting on one of the wobblers to govern the direction of operation of said motor by tilting the wobbler to one or the other side of neutral, an adjustable displacement determining member engageable by said one of the wobblers to determine the extent of tilt thereof by said last mentioned means in either direction away from neutral whereby said member has a single position of adjustment for any given tilt of said one wobbler regardless of the direction of tilt thereof, and common means for controlling the adjustment of both said member and the extent of tilt of the remaining wobbler comprising interconnecting means between said adjustable member and the remaining wobbler including hydraulic means for aiding in the adjustment of the remaining wobbler and servo control means determining the position of said interconnecting means.

22. A hydraulic transmission comprising, in combination, a piston motor including a wobbler, a piston pump for supplying operating fluid to said motor also including a wobbler, a hydraulic circuit connecting said pump and said motor, and control means to govern the rate and direction at which said motor is driven by said pump comprising means acting on one of the wobblers to govern the direction of operation of said motor by tilting the wobbler to one or the other side of neutral, an adjustable displacement determining member engageable by said one of the wobblers to determine the extent of tilt thereof by said last mentioned means in either direction away from neutral whereby said member has a single position of adjustment for any given tilt of said one wobbler regardless of the direction of tilt thereof, and common means for controlling the adjustment of both said member and the extent of tilt of the remaining wobbler comprising interconnecting means between said adjustable member and the remaining wobbler including hydraulic means for aiding in the adjustment of the remaining wobbler and manually adjustable mechanical means for limiting the extent of shift of said interconnecting means in one direction.

23. A hydraulic transmission comprising, in combination, a piston motor including a wobbler, a piston pump for supplying operating fluid to said motor also including a wobbler, a hydraulic circuit connecting said pump and said motor, and control means to govern the rate and direction at which said motor is driven by said pump comprising means acting on one of the wobblers to govern the direction of operation of said motor by tilting the wobbler to one or the other side of neutral, a member adjustable axially of said one of the wobblers and engageable by said one of the wobblers to determine the extent of tilt thereof in either direction away from neutral whereby said member has a common direction of movement for permitting increased tilt of said one wobbler regardless of the direction of tilt thereof, and common means for controlling the adjustment of both said member and the extent of tilt of the remaining wobbler.

24. A hydraulic transmission comprising, in combination, a piston motor including a wobbler, a piston pump for supplying operating fluid to said motor also including a wobbler, the wobbler of said pump being adjustable to either side of neutral to vary the displacement and the direction of discharge of fluid from said pump, a hydraulic circuit connecting said pump and said motor, and control means to govern the rate and direction at which said motor is driven by said pump comprising means acting on the wobbler of said pump to govern the direction of operation of said motor by tilting the wobbler of said pump to one or the other side of neutral, a member adjustable axially of said pump wobbler and engageable thereby upon tilt of said pump wobbler in either direction away from neutral to determine the extent of tilt of said wobbler, said member having a common direction of movement for permitting increased tilt of said pump wobbler regardless of the direction of tilt thereof, means variably limiting the extent of movement of said member axially away from said pump wobbler, and means interconnecting said member and the wobbler of said motor to effect adjustment of the displacement of said motor simultaneously with and proportionally to the displacement adjustment of said pump but independently of the adjustment for direction of discharge of said pump.

25. A hydraulic transmission comprising, in combination, a piston motor including a wobbler, a piston pump for supplying operating fluid to said motor including a drive shaft for said pump and a wobbler pivotally mounted on said shaft, a hydraulic circuit connecting said pump and said motor, and control means to govern the rate and direction at which said motor is driven by said pump comprising a member adjustable axially of said pump shaft relative to said pump wobbler and having portions disposed on diametrically opposite sides of said shaft on a diameter at right angles to the axis about which said wobbler pivots to be engageable by and limit the tilt of said pump wobbler in either direction of tilt from neutral position, governing means variably limiting the extent of movement of said member axially away from the point of mounting of said pump wobbler on said shaft, means acting on said pump wobbler tilting the same to one or the other side of neutral to determine the direction of fluid discharge by said pump and against said member to shift said member to the extent permitted by said governing means to determine the displacement of said pump, and means interconnecting said member and the wobbler of said motor for adjusting the displacement only of said motor.

GUNNAR A. WAHLMARK.